March 21, 1939.    B. H. MILLER    2,151,298
SUPPORT FOR HOLLOW BODIES
Filed Sept. 7, 1935    2 Sheets—Sheet 1
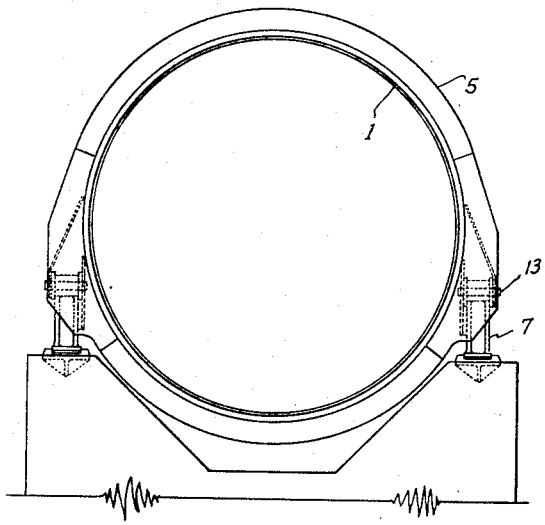
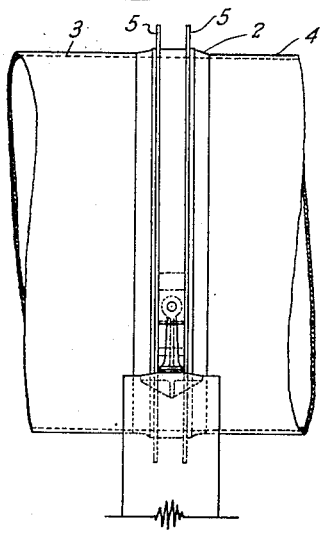
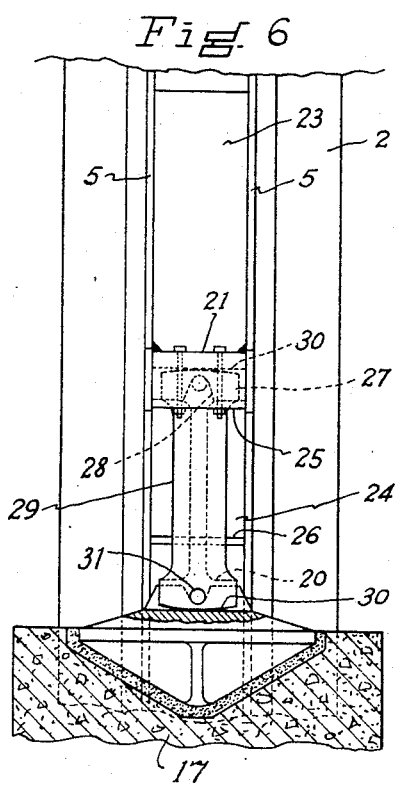
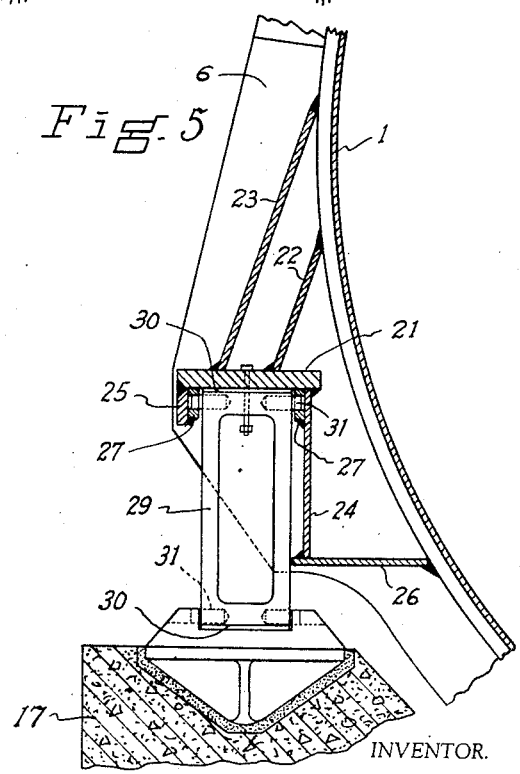
INVENTOR.
Benjamin H. Miller
BY
ATTORNEY.

March 21, 1939.   B. H. MILLER   2,151,298
SUPPORT FOR HOLLOW BODIES
Filed Sept. 7, 1935   2 Sheets-Sheet 2
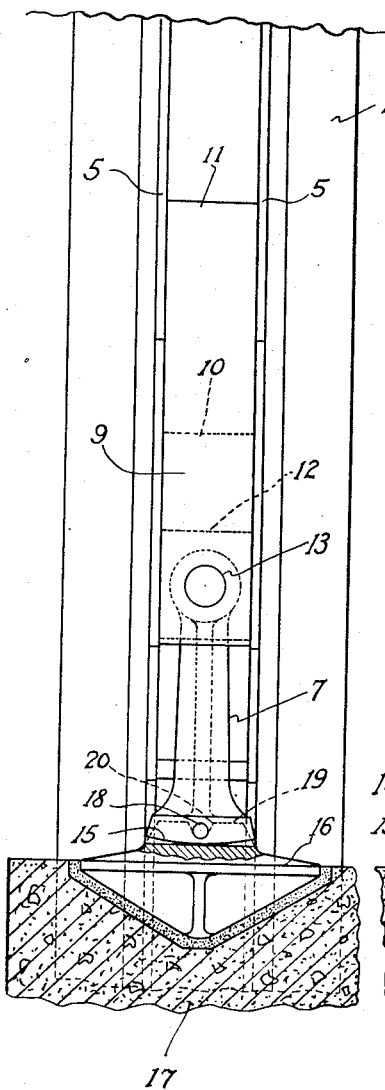
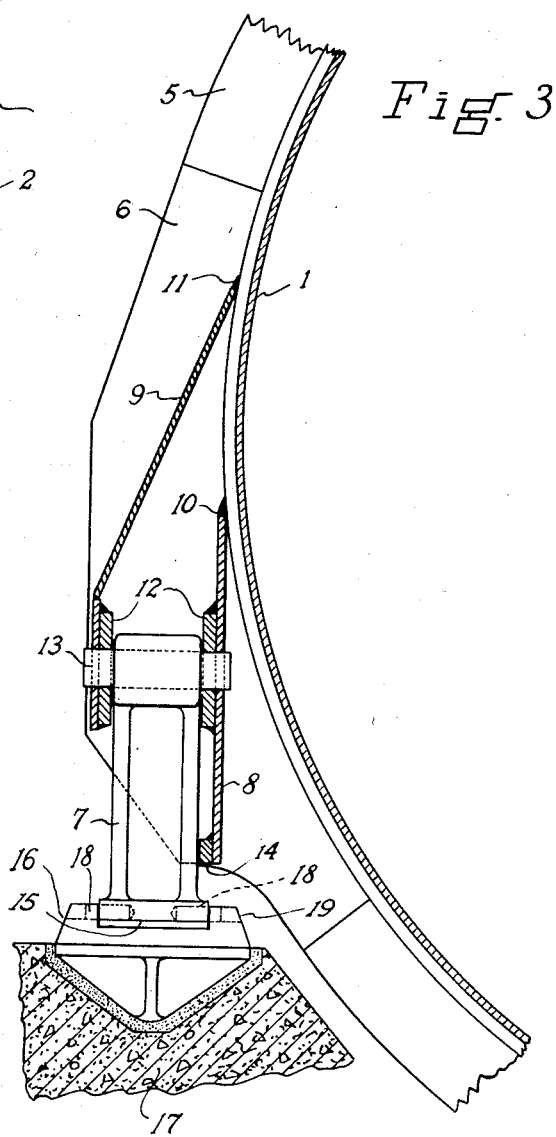
INVENTOR.
Benjamin H. Miller
BY
ATTORNEY.

Patented Mar. 21, 1939

2,151,298

UNITED STATES PATENT OFFICE 2,151,298

SUPPORT FOR HOLLOW BODIES

Benjamin H. Miller, Wadsworth, Ohio, assignor to The Babcock & Wilcox Company, Newark, N. J., a corporation of New Jersey Application September 7, 1935, Serial No. 39,528

11 Claims. (Cl. 248—49)

This invention relates to an improvement in the construction of long hollow bodies and in particular refers to the support of bodies of that character such as large diameter, heavy, metallic conduits, subject to relatively high internal pressures, large static loading and which carry fluids over relatively long distances.

A conduit of this type must necessarily be made up of a plurality of sections bolted, riveted, welded or otherwise joined together, and the joints must at all times be maintained in a fluid-tight condition.

The support of such a conduit becomes a real problem when it is considered that the combined weight of the conduit and its contents may reach a static load as high as 55,000 pounds per foot of length, and in some instances even higher.

In addition there must be some provision for any longitudinal movements of the conduit which may result from temperature variations or other causes. I have therefore devised a manner of support which is a decided improvement in the art, and which satisfactorily serves its purposes as has been demonstrated by actual performance.

The invention is adaptable to constructions which involve high static loads so that there will be no failure or even detrimental deformation of the body under these loads, and in which the body in support is permitted to move longitudinally to compensate, for example, for whatever expansion or contraction creep may take place.

I have also evolved the means for securing the foregoing and other advantages, which include members so fashioned and coordinated that adequate provision is made for the proper distribution and accommodation of the strains and stresses to which a structure of this kind is subjected.

In order that the invention may be fully understood, I shall describe the same with respect to the following drawings:

Fig. 1 is an end view of a conduit and shows the symmetrical arrangement of the supporting structure;

Fig. 2 is a side elevation of the conduit and supporting structure;

Fig. 3 shows an enlarged detail of Fig. 1;

Fig. 4 is a side view of the detail shown in Fig. 3;

Fig. 5 shows a modification in the support details but is otherwise similar to Fig. 3; and Fig. 6 is a side view of the modification shown in Fig. 5.

While in practice a plurality of supports are required at suitable intervals along the conduit length, the description will refer particularly to the supporting arrangement at only one location, the construction being repeated at other positions along the conduit as required. The conduit is indicated generally at 1 and is provided at the point of support with a stiffener-ring 2, integrally united to the portions 3 and 4 of the conduit. The stiffener-ring may take different forms, but is here shown as including a circular band of metal thickened at its mid-section but reduced at its ends to a thickness substantially equal to that of the conduit portions to which it is united, as is set forth in U. S. Patent No. 1,979,424, issued to James E. Trainer et al., November 6, 1934. Annular rings 5 are welded to the band at spaced positions and form a part of the stiffener-ring structure 2. These rings may consist of a plurality of arcuate sections 6 which are welded to each other and to the circular band to form continuous rings circumscribing the conduit.

Brackets are secured to the stiffener-ring at opposite sides of the conduit axis to provide trunnion supports for rocker-shoes 7 or struts which are pivoted thereto. The brackets consist of plate members 8 and 9 which are welded to the stiffener-ring at circumferentially spaced locations 10 and 11, and are also welded to the annular rings 5 to form a frame in which the rocker-shoe or strut is pivoted. Pads 12 are welded to the inner and outer plates 8 and 9 and to the rings 5, to provide a sufficient bearing length for the pivot pin 13. The pads also serve as a reinforcement to the frame as do also the bars 14 which are welded to the bottom edges of the inner plates 8 and to the rings 5.

The bars 14, moreover, have the distinct and important function of transmitting sidewise thrust such as might result from wind pressure against the conduit. Their thickness is such that the face of each bar is in close proximity to the corresponding rocker 7, but with an appropriate clearance for free movement of the rocker under normal conditions. The bar being secured to the lower portion of the downwardly extending plate 8, transmits the sidewise thrust against the rocker at a point near its base, without setting up an undue bending stress in the rocker.

The rocker-shoe 7 has a hole through its upper end for the pivot pin and its lower end surface is curved about the axis of the pivot pin to provide a rocking surface 15 which rests on a shoe plate 16 embedded in a concrete footing 17. Pins 18 are mounted in the rocker shoe at its lower end, and project short distances from opposite sides of the shoe. The shoe plate is provided with upstanding flanges 19 which have notches 20 in their upper edges to receive the pins 18, thus preventing or limiting lateral displacement of the rocking shoe with respect to the footing so that its movement is mainly of a rotational nature about its line of contact with the surface of the shoe plate.

With the foregoing combination of elements, it will be seen that the static load of that portion of the conduit and its contents with which the parts are associated, is transmitted through the symmetrically arranged rocker-shoes to the shoe plate and footing. The reaction in the conduit structure is transmitted through the brackets and by reason of their arrangement, a proper division of the forces is made, so that the stresses are distributed over a wide band and throughout the parts, to insure safety of the entire assembly under all operating conditions.

In the modification according to Figs. 5 and 6, a bracket member indicated generally at 21, is welded to the annular rings 5. Above this bracket and supporting it, are plates 22 and 23 which are welded to the bracket, to the rings and to the conduit. Below the bracket are other plates 24 and 25 which, like the plates 22 and 23, are also welded to the bracket and to the rings.

An additional plate 26, extending between the conduit and the lower end of the plate 24, also forms a part of the bracket supporting structure and is welded at its periphery to plate 24, the rings 5 and to the conduit. The outer edge of plate 26 projects beyond the lower edge of downwardly extending plate 24 to a point closely adjacent the rocker 29. Under a wind-load condition, the edge of plate 26 and the rocker 29 are brought into contact, and the sidewise thrust thus being applied to the rocker at a point near its base, is more effectively resisted without causing an undue bending stress in the rocker.

Smaller plates 27 are welded in position below the bracket and inside of the plates 24 and 25, with their inclined edges forming an inverted V shaped notch 28.

The rocking shoe 29 is of the same general form, top and bottom, and corresponds to that shown in Figs. 3 and 4, for the lower end of the shoe 7, the end surfaces being curved at 30, and pins 31 projecting from opposite sides of the shoe.

The pins in the upper end of the shoe are received in the notches 28 which are formed by the plates 27 in order to restrict any tendency toward lateral movement between the shoe and conduit, while the pins 31 in the lower end are received in notches 20 in the same manner and for the same purpose as described in connection with Figs. 3 and 4.

While, in the foregoing, specific forms of the invention have been illustrated it is also evident that in connection with the design as shown in Fig. 1, for instance, the position of the parts may be reversed, that is to say, the shoe plate 16 may be carried on the conduit and the rocking surface 15 and pivot pin 13 reversed in position from that described without departing from the spirit and scope of the invention as claimed.

I claim:

1. In combination with a conduit subject to creeping and heavy static loading, an arcuately formed supporting structure secured to said conduit and embracing said conduit at opposite sides, said structure embodying outwardly extending rib portions normal to the longitudinal axis of the conduit, foundation means below said axis, means transferring the conduit loading to said foundation including rocking links engaging said foundation means at their lower ends, said rib portions having means cooperating therewith to form bearings for the upper ends of said links, and means restricting the movement of said links to substantially vertical planes parallel to the conduit axis.

2. In combination, a conduit subject to creeping and heavy static loading, a supporting structure for the conduit comprising means shaped to transfer the strain and distribute the supporting stresses throughout a wide band on the conduit, a foundation structure, and opposite links between the said structures each having a cylindrically-curved rocking face on at least one end thereof and a centering pin projecting from a side face of the link at the same end and extending parallel to the axis of curvature of said face, one of said structures having a bearing surface for said rocking face and means engaging said pin.

3. In combination, a conduit subject to creeping and heavy static loading, a support for the conduit comprising means shaped to transfer the strain and distribute the supporting stresses throughout a wide band on the conduit, a foundation, and opposite links disposed in vertical planes between the means and foundation, each having a rocking face on at least one end thereof, and a horizontally extending centering pin at said end, said foundation including means to receive said pin and shoe plates forming horizontally disposed bearing surfaces for the said rocking ends.

4. Apparatus including a hollow body of substantial exterior surface, a stationary footing, a supporting member between the body and footing for transmitting to said footing downward thrust due to static load, and means delivering lateral thrust to said supporting member at a location intermediate its ends, whereby the bending stress in said member is minimized when said body is subjected to fluid pressure on its exterior surface.

5. The combination with a conduit subject to heavy static load and creeping which comprises wide bands of support entirely circumscribing the conduit and embodying portions normal to the axis of the conduit and secured thereto, members providing bearing surfaces parallel to the axis of the conduit and secured, one at each side of the conduit, intermediate said normally disposed portions, foundation means below the normal position of the aforesaid members, and rocking links between the foundation means and the members and fixed at one end at least against relative displacement.

6. In combination, a conduit subject to creeping and heavy static loading, a support for the conduit including arcuate rib portions secured to the conduit at opposite sides of the vertical center line and throughout their arcs of engagement with the conduit, bracket members secured to said rib portions, a foundation, and vertically disposed rocking struts between said bracket members and the foundation whereby downward thrust is transmitted to the foundation, the movement of said struts being limited substantially to vertical planes parallel to the conduit axis.

7. Supporting means for a conduit subject to creeping and heavy static loading including a foundation, a bracket structure secured to the conduit, a vertically disposed rocking strut cooperatively engaging said bracket structure and foundation, said bracket structure being anchored to the conduit above and below the horizontal center line and having a portion projecting laterally in close proximity to the lower end of said rocking strut.

8. Supporting means for a conduit subject to creeping and heavy static loading including a plurality of rib members extending circumferentially of the conduit and welded to the conduit substantially throughout their arcuate lengths, a bracket structure welded to said rib members and to said conduit at each side of the vertical center line, a foundation, vertically disposed struts between the bracket structures and said foundation, said bracket structures having parts contiguous to the lower extremities of said struts.

9. Means transmitting thrust between relatively movable structures comprising a rocker provided with a cylindrically curved bearing surface at one end, and guiding means for said end comprising a pin on said rocker extending parallel to the axis of curvature of said curved surface at a location between said surface and its axis of curvature and engaging a notched member secured to one of said relatively movable structures.

10. Means transmitting heavy static load between structures such as a conduit and its foundation, comprising a rocker pivotally retained at one end and provided with a cylindrically curved bearing surface at the opposite end, a notched member forming part of one of said structures, and a pin extending from said opposite rocker end parallel to the axis of curvature of said curved surface at a location between said surface and its axis of curvature and into a notch in said member.

11. In combination with a conduit having an inserted stiffener ring joined at its ends to adjacent portions of said conduit and constituting an integral part of the conduit length, said ring having a maximum wall thickness at an intermediate location and a reduced wall thickness at the junctures with adjoining conduit portions, a foundation, and means for supporting said conduit on said foundation including a wide supporting band secured to said ring at its intermediate location and having connected means providing bearings at opposite sides of said conduit, rocker means interposed between said bearings and said foundation and fixed at one end at least against relative displacement, the movement of said rocker means being limited substantially to vertical planes parallel to the conduit axis.

BENJAMIN H. MILLER.